United States Patent
Shibao

(10) Patent No.: US 7,095,413 B2
(45) Date of Patent: Aug. 22, 2006

(54) ANIMATION PRODUCING METHOD AND DEVICE, AND RECORDED MEDIUM ON WHICH PROGRAM IS RECORDED

(75) Inventor: Tadahide Shibao, Takaishi (JP)

(73) Assignee: Sharp Kabushiki Kaisha, Osaka (JP)

( * ) Notice: Subject to any disclaimer, the term of this patent is extended or adjusted under 35 U.S.C. 154(b) by 281 days.

(21) Appl. No.: 10/296,713

(22) PCT Filed: May 28, 2001

(86) PCT No.: PCT/JP01/04472

§ 371 (c)(1),
(2), (4) Date: Nov. 27, 2002

(87) PCT Pub. No.: WO01/93207

PCT Pub. Date: Dec. 6, 2001

(65) Prior Publication Data
US 2003/0132938 A1    Jul. 17, 2003

(30) Foreign Application Priority Data
May 30, 2000    (JP) ............................. 2000-161041

(51) Int. Cl.
*G06T 15/70*    (2006.01)
(52) U.S. Cl. ..................... 345/473; 345/474; 345/629
(58) Field of Classification Search ............... 345/473, 345/629, 474
See application file for complete search history.

(56) References Cited

U.S. PATENT DOCUMENTS 6,008,818 A * 12/1999 Amakawa et al. .......... 345/473
6,011,562 A * 1/2000 Gagne et al. ............... 345/473
6,232,965 B1 * 5/2001 Scott et al. .............. 715/500.1
6,278,455 B1 * 8/2001 Baker ......................... 715/716

FOREIGN PATENT DOCUMENTS

| JP | 5-20425 | 1/1993 |
| JP | 8-263681 | 10/1996 |
| JP | 10-261105 | 9/1998 |
| JP | 2000-099757 | 4/2000 |
| JP | 2000-99757 | 4/2000 |
| JP | 2000-113206 A | 4/2000 |

OTHER PUBLICATIONS

"A Microworld With Its Construction Site" Takafumi Noguchi, et al, pp. Jan. 1995, vol. 36, No. 1, 153-166.

* cited by examiner

*Primary Examiner*—Kimbinh T. Nguyen
(74) *Attorney, Agent, or Firm*—Birch, Stewart, Kolasch and Birch, LLP

(57) ABSTRACT

An animation creating device creates composite animation, in which an object has been added to a pre-described animation image that includes a motion object, the animation creating device including: an additional object selecting section (14), which selects an additional object; a motion animation creating section (20), which generates motion animation, in which the motion object moves according to the selected additional object, using the pre-described animation image; and an animation composite section (15), which combines the motion animation with an animation image of the additional object. This provides an animation creating method and an animation creating device with a capability to create composite animation with simple operations and in a short period of time. An animation creating program, which is provided to execute the animation creating method on a computer, is recorded in a computer-readable recording medium.

19 Claims, 13 Drawing Sheets

FIG. 9

<PRE-DESCRIBED ANIMATION IMAGE DATA STRUCTURE>
    <PRE-DESCRIBED ANIMATION IMAGE FILE NAME: 6.anime>

<PRE-DESCRIBED ANIMATION IMAGE FILE ID:6>

<PART NAME: 61. part>
        <PART ID: 61>
            <PART POINT COORDINATES (x, y):(X63, Y63), (X64, Y64)>
            <PART POINT LINE SEGMENT INFORMATION: line 61>
        <PART NAME: 62. part>
        <PART ID: 62>
            <PART POINT COORDINATES (x, y):(X64, Y64), (X65, Y65)>
            <PART POINT LINE SEGMENT INFORMATION: line 62>
            ⋮

FIG. 10

<ADDITIONAL OBJECT DATA STRUCTURE>
<ADDITIONAL OBJECT ICON IMAGE INFORMATION>

<CONTROL TARGET PRE-DESCRIBED ANIMATION IMAGE FILE NAME: 6.anime>
    <CONTROL TARGET PRE-DESCRIBED ANIMATION IMAGE FILE ID:6>
        <ADDITIONAL ANIMATION FILE>
            <CONTROL TARGET PART ID:61>
            <CONTROL AMOUNT>

<CONTROL TARGET PART ID:62>
            <CONTROL AMOUNT>
            ⋮

<CONTROL TARGET PRE-DESCRIBED ANIMATION IMAGE FILE NAME: *.anime>
    <CONTROL TARGET PRE-DESCRIBED ANIMATION IMAGE FILE ID:*>
        <ADDITIONAL ANIMATION FILE NAME:*.anime>
        ⋮

FIG. 11

<ADDITIONAL ANIMATION FILE>
    <CONTROL TARGET PART ID:61>
    <CONTROL AMOUNT (sx1, sy1, sx2, sy2), (ex1, ey1, ex2, ey2)>

<CONTROL TARGET PART ID:62>
    <CONTROL AMOUNT>

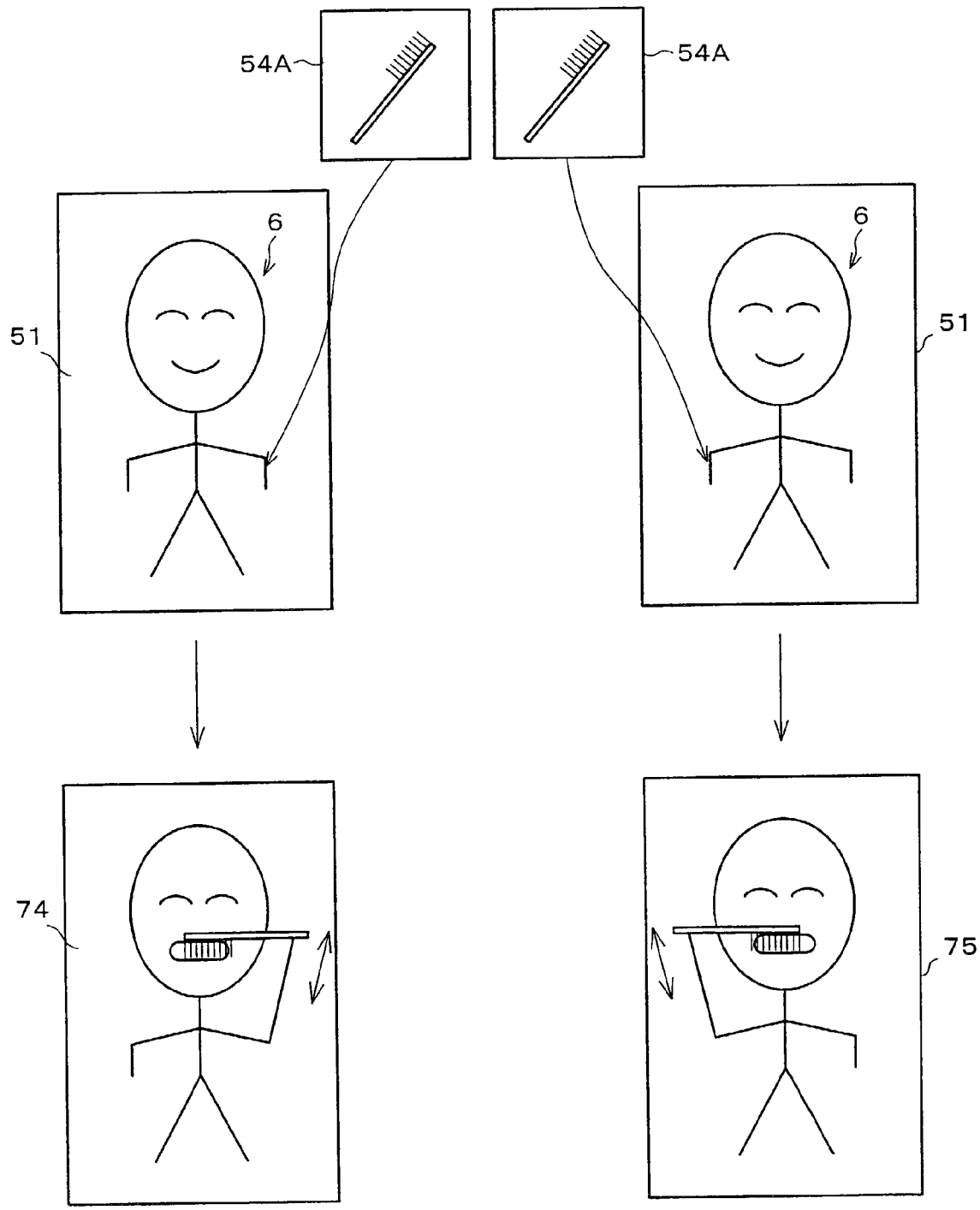

FIG. 14

<ADDITIONAL OBJECT DATA STRUCTURE>
<ADDITIONAL OBJECT ICON IMAGE INFORMATION>

<CONTROL TARGET PRE-DESCRIBED ANIMATION IMAGE FILE NAME: 6.anime>
    <CONTROL TARGET PRE-DESCRIBED ANIMATION IMAGE FILE ID:6>
        <ADDING POSITION RANGE (x11, y11, x12, y12, x13, y13, x14, y14)>
        <ADDITIONAL ANIMATION FILE>
            <CONTROL TARGET PART ID:61>
            <CONTROL AMOUNT>

<CONTROL TARGET PART ID:62>
            <CONTROL AMOUNT>

<ADDING POSITION RANGE (x21, y21, x22, y22, x23, y23, x24, y24)>
        <ADDITIONAL ANIMATION FILE>
            <CONTROL TARGET PART ID:63>
            <CONTROL AMOUNT>

<CONTROL TARGET PART ID:64>
            <CONTROL AMOUNT>
            ⋮

<CONTROL TARGET PRE-DESCRIBED ANIMATION IMAGE FILE NAME: *.anime>
    <CONTROL TARGET PRE-DESCRIBED ANIMATION IMAGE FILE ID:*>
        <ADDITIONAL ANIMATION FILE NAME:*.anime>
        ⋮

FIG. 15 (a)
FIG. 15 (b)
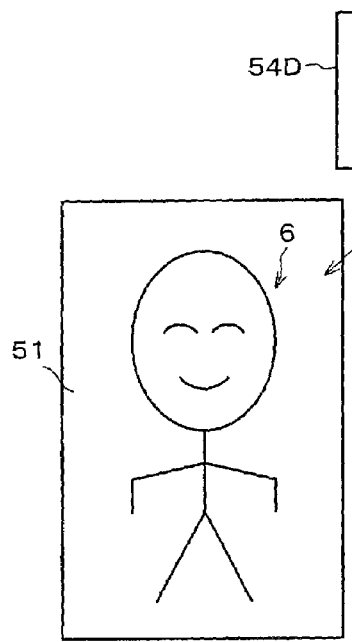
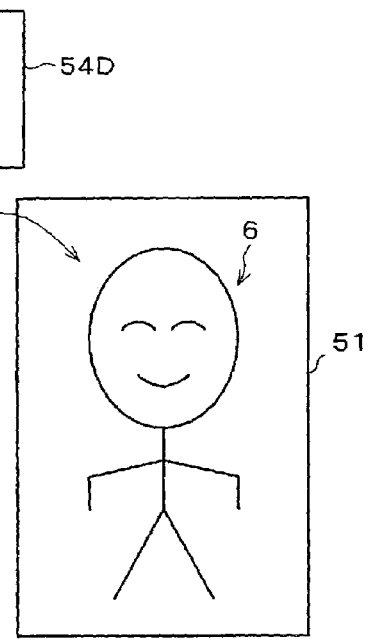
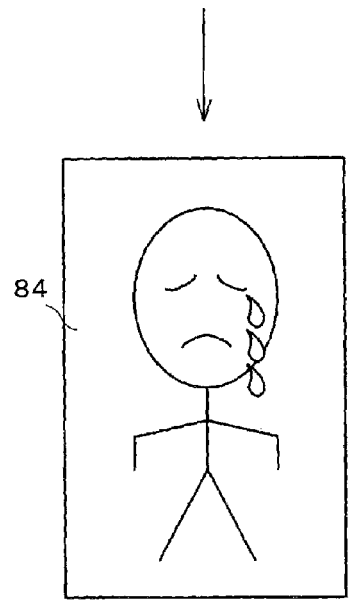
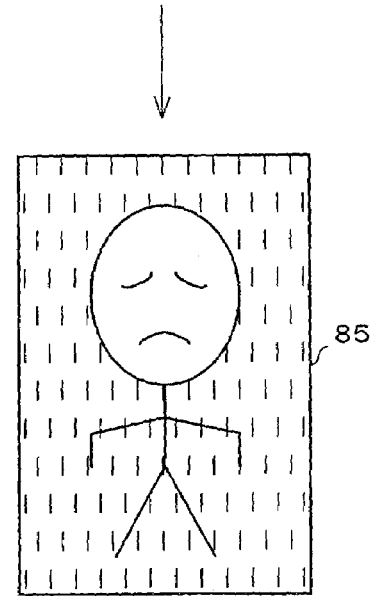

ANIMATION PRODUCING METHOD AND DEVICE, AND RECORDED MEDIUM ON WHICH PROGRAM IS RECORDED

This application is the national phase under 35 U.S.C. § 371 of PCT International Application No. PCT/JP01/04472 which has an International filing date of May 28, 2001, which designated the United States of America.

FIELD OF THE INVENTION

The present invention relates to animation creating methods and animation creating devices, and animation creating programs and computer-readable recording media recording same, which are used to automatically create animation. The invention particularly relates to animation creating methods and animation creating devices, and animation creating programs and computer-readable recording media recording same, which are used to automatically create character animation, in which facial expressions and motions of human figures are realized on computer applications, such as that using personal computers.

More particularly, the present invention relates to animation creating methods and animation creating devices, and animation creating programs and computer-readable recording media recording same, which serve as an authoring tool that can automatically create a character motion that corresponds to an additional object, only by choosing an object to be added to the character animation, in addition to automatically creating animation of the additional object.

BACKGROUND OF THE INVENTION

A character animation authoring tool, which is one type of animation creating programs, adopts a method in which an animation is created by joining together animation parts that are created by dividing a meaningful series of motions or expressions into individual parts.

Japanese Unexamined Patent Application No. 99757/2000 (Tokukai 2000-99757, published on Apr. 7, 2000) discloses an animation creating method and an animation creating device, in which animation parts of a character are used to allow easy editing of an animation that contains images of smoothly changing character expressions and motions.

More specifically, the animation creating device of the foregoing example has a memory that stores animation parts, which are created by dividing a series of character motions and expressions into a plurality of frames, and attribute values of these animation parts. In addition, the foregoing animation creating device has an input section, where animation is created according to the story, by joining together animation parts that are selected according to each step of the story sequence.

Further, in the animation creating method of this animation creating device, the divided character animation parts, as well as the attribute values indicative of features of motions or expressions of each animation part, are stored in a database ("DB" hereinafter), wherein required attribute values are entered in each step of the story sequence, so as to select and join animation parts.

This enables the character to move smoothly according to the entered attribute values in conformity with the story, thereby easily editing a high quality animation using animation parts.

Thus, there has been a conventional method in which attribute values of animation character parts are entered according to the development of the story with respect to an animation character that has been described by a predetermined method. Specifically, the method enters changes in shape or motion of individual animation parts that make up the described animation, so as to display the output.

However, the conventional animation creating method does not allow a part or an object for making additional animation to be inserted by simple operations with respect to the described animation. Adding or inserting an additional object by a user is enabled only by newly creating an object using an animation editing system.

Further, the conventional animation creating method requires that the database be reconstructed to describe the relation between the inserted part or object and the pre-described animation. It is therefore impossible to change the pre-described animation according to the inserted part or object. Consequently, when shapes or motions of the described animation are to be changed accordingly to the additional object, the pre-described animation itself needs to be re-edited.

Accordingly, it is an object of the present invention to provide animation creating methods and animation creating devices, and animation creating programs and computer-readable recording media recording same, which require simple operations and a short time to create composite animation, i.e., a pre-described animation image with an additional object.

DISCLOSURE OF THE INVENTION

The foregoing object is achieved by an animation creating technique of the present invention, which, upon entry of editing instructions, adds a previously created second object to an image of pre-described animation that includes a first object, wherein selecting a second object by a user automatically creates motion animation, in which the first object of the pre-described animation moves according to the second object.

Specifically, in the present invention, in order to create the motion animation, the second object includes control information for controlling movement of the first object. For example, the second object includes control information that controls changes in movement and shape of the parts making up the first object.

Namely, in order to achieve the foregoing object, the present invention provides an animation creating method, which is a method for creating composite animation by entering editing instructions (user instructions for editing animation) so as to add a previously created second object (animation image of a second object) to a pre-described animation image that includes a first object, and the method includes the steps of: selecting a second object; generating motion animation in which the first object moves according to the selected second object, using the pre-described animation image; and combining the motion animation with the animation image of the second object.

With this method, the user is only required to select a second object to be added to the image of pre-described animation that includes a first object, so as to automatically create motion animation in which the first object moves according to the second object and combine the motion animation with the animation image of the second object. The user is therefore not required to search for animation of the first object that corresponds to the second object or newly create such animation. This enables the composite animation, in which the animation image of the second object is added to the pre-described animation image, to be created with simple operations, thereby greatly reducing the time required to create animation.

This contrasts to a method in which animation of the first object is simply combined with the animation image of the second object. Such a method requires the user to search for the animation of the first object that corresponds to the second object from the pre-described animation image, or to newly create such animation. User operations are thus complex and it takes a long time to complete the animation.

Note that, as the term is used herein, "animation image" refers to not only motion images of animation but also an image of a representative frame of the animation.

Further, in order to achieve the foregoing object, the present invention provides an animation creating method, which is a method for creating composite animation by entering editing instructions so as to add a previously created second object (animation image of a second object) to a pre-described animation image that includes a first object, and the method includes the steps of: selecting at least one of the second objects in relation to the first object; generating motion animation in which the first object moves according to contents of a relation between the selected second object and the first object (e.g., a relative position of the second object with respect to the first object), using the pre-described animation image; and combining the motion animation with animation image of the second object.

With this method, the user is only required to select a second object to be added to the image of pre-described animation that includes a first object, so as to automatically create motion animation in which the first object moves according to the second object and combine the motion animation with the animation image of the second object. The user is therefore not required to search for animation of the first object that corresponds to the second object or newly create such animation. This enables the composite animation, in which the animation image of the second object is added to the pre-described animation image, to be created with simple operations, thereby greatly reducing the time required to create animation.

The foregoing method enables movement of the first object to be changed according to contents of a relation between the second object and the first object. This enables a plurality of animation to be created with a single second object, thereby easily creating a variety of animation.

It is preferable that the animation creating method of the present invention further includes the step of outputting composite animation, which is the result of combining the motion animation with the animation image of the second object.

Further, in order to achieve the foregoing object, a preferred embodiment of the animation creating method of the present invention further includes the step of preparing plural types of object data that include control information for controlling the animation image of the second object and movement of the first object (e.g., the step of preparing a database of plural types of object data), wherein, in the step of selecting the second object, at least one of the object data is selected, and, in the step of generating the motion animation, movement of the first object is controlled based on the control information.

With the foregoing method, by the provision of the plural types of object data that include control information for controlling animation image of the second object and movement of the first object, the user only needs to add object data to increase the number of types of usable second objects. Thus, even a common user is able to readily increase the number of types of usable second objects.

Further, with the foregoing method, the provision of the plural types of object data that include control information for controlling animation image of the second object and movement of the first object enables these object data to be distributed to users via communication networks such as the Internet, so that an additional second object data can be used. Further, by releasing the data format of the object data to the user, or by separately providing software specifically designed to edit the object data, the user is able to create and add additional object data.

This contrasts to other method, for example, such as a method of creating animation of the first object by referring to a database, in which the second object is related to the animation of the first object separately from the data of the second object. In order to increase the number of types of usable second objects in such a method, the database needs to be restructured. This makes it difficult for a common user to increase the number of types of usable second objects.

Note that, preferably, the control information indicates changes in movement and shapes of the parts making up the first object. This enables character motions, e.g., animation (character animation) expressing changes in facial expressions or movement of limbs to be realized with object data having a relatively small information volume.

It is preferable that the animation creating method further includes the step of displaying an icon that represents the second object, wherein, in the step of selecting the second object, the user selects one of displayed icons, using an input device such as a pointing device, so as to automatically select the second object. In this way, the user is able to readily select the second object.

It is preferable in the step of displaying an icon that represents a second object that only those icons representing second objects that can be added to the pre-described animation image are displayed. In this way, the user to prevented from selecting a second object that cannot be added to the selected first object. The user can enter the second object even more easily this way.

It is preferable that the animation creating method of the present invention further includes the steps of: outputting (holding) an animation file, which is the animation obtained by combining the motion animation with the animation image of the second object; selecting a third object different from the second object; generating second motion animation in which the first object moves according to the selected second and third objects, using the animation file stored in a storage device; and combining the second motion animation with the animation image of the third object.

According to this method, by outputting (holding) the animation file, which is the animation obtained by combining the motion animation with the second object, the user is able to confirm the animation being combined only with the second object.

Further, in order to achieve the foregoing object, a preferred embodiment of the animating creating device of the present invention further includes the step of entering positional information that is indicative of a position of the animation image of the second object added to the pre-described animation image, wherein, in the step of generating motion animation, the motion animation is changed in accordance with the positional information.

With this method, different types of composite animation can be created using a single type of second object, thereby easily creating a variety of animation.

Further, in order to achieve the foregoing object, a preferred embodiment of the animation creating method of the present invention further includes the step of entering positional information that is indicative of a position of the animation image of the second object added to the pre-described animation image, wherein, in the step of selecting the second object, the second object is changed according to the positional information.

With this method, only the positional information entered by the user needs to be changed to select different types of second objects and create different types of composite animation. Thus, a variety of animation can be easily created.

The animation creating method of the present invention may be adapted so that, in the step of selecting the second object, a plurality of different objects are successively selected as second objects, and, in the step of generating motion animation, movement of the first object is controlled based on order the second objects were selected.

Note that, in the foregoing method, the control information for controlling movement or shapes of parts making up the first object included in the original image data may be selected according to the entered position (insert position) of the second object, as will be described in the Second Embodiment.

In a preferred embodiment of the animation creating method of the present invention, additional animation, which is the animation of the second object, is entered in the step of entering the second object, and the motion animation is combined with the additional animation in the step of combining the motion animation with the second object.

In order to achieve the foregoing object, the present invention provides an animation creating device for creating composite animation by entering editing instructions so as to add a previously created second object to a pre-described animation image that includes a first object, the animation creating device including: an object selecting section, which selects the second object; a motion animation generating section, which generates motion animation in which the first object moves according to the selected second object, using the pre-described animation image; and an animation composite section, which combines the motion animation with an animation image of the second object.

With this configuration, the user only needs to select through the object selecting section a second object to be added to the pre-described animation image that includes the first object, so as to automatically create motion animation in which the first object moves according to the second object and combine the motion animation with the animation image of the second object in the animation composite section. The user is therefore not required to search for animation of the first object that corresponds to the second object or newly create such animation. Thus, the foregoing configuration enables the composite animation, in which the animation image of the second object is added to the pre-described animation image, to be created with simple operations, thereby greatly reducing the time required to create animation.

In order to achieve the foregoing object, the present invention provides an animation creating program, recorded in a computer-readable recording medium, that creates composite animation upon entry of user editing instructions, by adding a previously created second object to a pre-described animation image that includes a first object, the animation creating program, in response to selection of the second object by a user, generating motion animation in which the first object moves according to the selected second object, using the pre-described animation image, and thereafter combining the motion animation with an animation image of the second object. Further, in order to achieve the foregoing object, the present invention provides a computer-readable recording medium, in which the animation creating program is recorded.

According to this configuration, upon user selection of a second object, the animation creating program automatically creates motion animation in which the first object moves according to the second object, and combines the motion animation so created with the animation image of the second object. The user is therefore not required to search for animation of the first object that corresponds to the second object or newly create such animation. Thus, the foregoing configuration enables the composite animation, in which the animation image of the second object is added to the pre-described animation image, to be created with simple operations, thereby greatly reducing the time required to create animation.

For a fuller understanding of the nature and advantages of the invention, reference should be made to the ensuing detailed description taken in conjunction with the accompanying drawings.

BRIEF DESCRIPTION OF THE DRAWINGS

FIG. 8(a) and FIG. 8(b) are drawings showing one example of an animation character image used in the animation creating method according to the present invention, in which FIG. 8(a) shows an entire image of the character; and FIG. 8(b) shows a magnified left arm portion of the character.

FIG. 9 is a drawing showing another example of the data structure of the pre-described animation image data used in the animation creating method according to the present invention.

FIG. 10 is a drawing showing one example of a data structure of additional object data used in the animation creating method according to the present invention.

FIG. 11 is a drawing showing one example of a data structure of part data included in the pre-described animation image data used in the animation creating method according to the present invention.

FIG. 13(a) and FIG. 13(b) are explanatory drawings explaining another embodiment of the animation creating method according to the present invention.

FIG. 14 is a drawing showing one example of a data structure of additional object data used in the animation creating method according to FIG. 13.

FIG. 15(a) and FIG. 15(b) are explanatory drawings explaining yet another embodiment of the animation creating method according to the present invention.

DESCRIPTION OF THE EMBODIMENTS

First Embodiment

One embodiment of the present invention is described below with reference to FIG. 1 through FIG. 12. An animation creating device according to the present embodiment creates composite animation in accordance with editing instructions of a user, wherein the composite animation is created by adding a previously created second object ("additional object" hereinafter) to pre-described animation image data, which is image data of a representative frame of animation containing a first object ("motion object" hereinafter). Note that, the image data of the pre-described animation may be image data of a plurality of frames of the animation containing the motion object, i.e., motion image data with the motion object.

Figure 1:
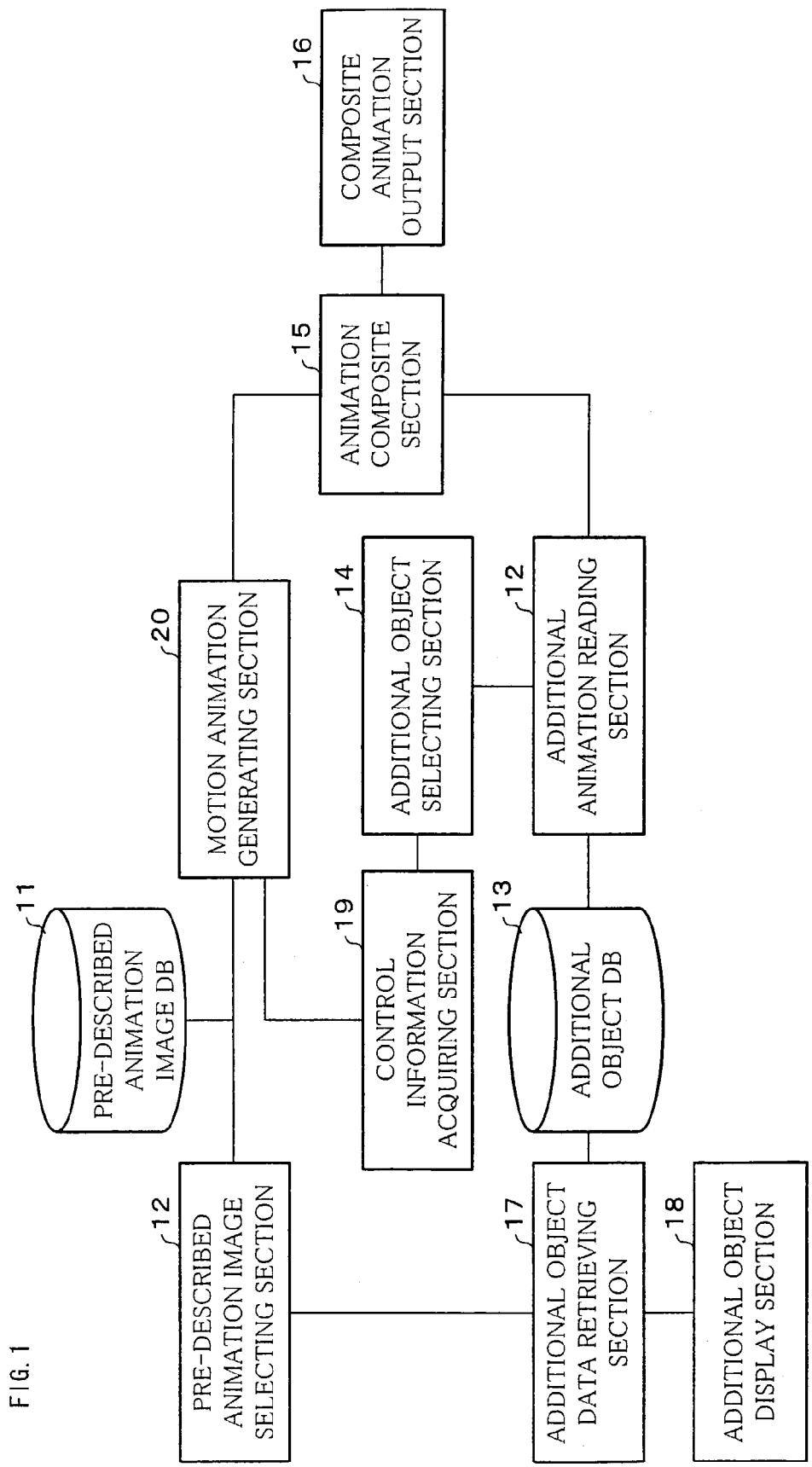
FIG. 1 is a block diagram schematically showing one embodiment of an animation creating device according to the present invention.

As shown in FIG. 1, an animation creating device 1 according to the present embodiment includes a pre-described animation image DB 11 and a pre-described animation image selecting section 12. The pre-described animation image DB 11 stores different types of pre-described animation image data, which become a prescribed form of target animation. The pre-described animation image selecting section 12 is provided to allow a user to select one of the different types of pre-described animation image data from the pre-described animation image DB 11.

Note that, the embodiment below describes the case where different types of pre-described animation image data are provided. However, the present invention is also applicable to only a single type of pre-described animation image data. In this case, the pre-described animation image selecting section 12 may be omitted.

The animation creating device 1 further includes an additional object DB 13, an additional object selecting section (object selecting section) 14, a control information acquiring section 19, and an additional animation reading section 21.

The additional object DB 13 stores different types of additional object data for additional objects to be added to the pre-described animation image data. The additional object data contain information concerning the additional object itself, such as animation data of the additional object ("additional animation data" hereinafter), and control information for controlling movement of the motion object (details will be described later). The additional object selecting section 14 is provided to allow a user to select one or more additional object data. The control information acquiring section 19 is provided to acquire, from the additional object DB 13, control information of the additional object data that was selected in the additional object selecting section 14. The additional animation reading section 21 reads out, from the additional object DB 13, additional animation data of the additional object data that was selected in the additional object selecting section 14.

The animation creating device 1 further includes a motion animation generating section 20, in which movement of the motion object is controlled, using the pre-described animation image data, based on the control information that was acquired in the control information acquiring section 19, so as to generate motion animation whose images are created by the movement of the motion object according to the additional object. The animation creating device 1 further includes an animation composite section 15, which executes a process of combining the motion animation with the animation images of the additional object.

The animation creating device 1 further includes an additional object data retrieving section 17 and an additional object display section 18, which are provided to help a user more easily make a selection through the additional object selecting section 14. The additional object data retrieving section 17 operates to retrieve, from the additional object DB 13, an additional object that can be added to the pre-described animation image data. The additional object display section 18 operates to display the result of retrieval in the additional object data retrieving section 17, i.e., the additional object that can be added to the pre-described animation image data, in the form of an icon (additional object icon). The information concerning the icon is stored in the additional object data as additional object icon image information.

The animation creating device 1 further includes a composite animation output section 16, which outputs the composite animation of the animation composite section 15 to a file.

The functional blocks shown in FIG. 1 can be realized by hardware, examples of which are described below. The pre-described animation image DB 11 and the additional object DB 13 can be realized by external memory devices, such as a hard disk, connected to a computer. The pre-described animation image selecting section 12 and the additional object selecting section 14 can be realized by pointing devices such as a mouse. The additional object display section 18 can be realized by display devices, such as a CRT (Cathode Ray Tube) display, connected to a computer. The other functional blocks can be realized by a computer (microprocessor and memory), which runs an animation creating program and an OS (Operating System) by reading them from an external memory device.

Figure 2:
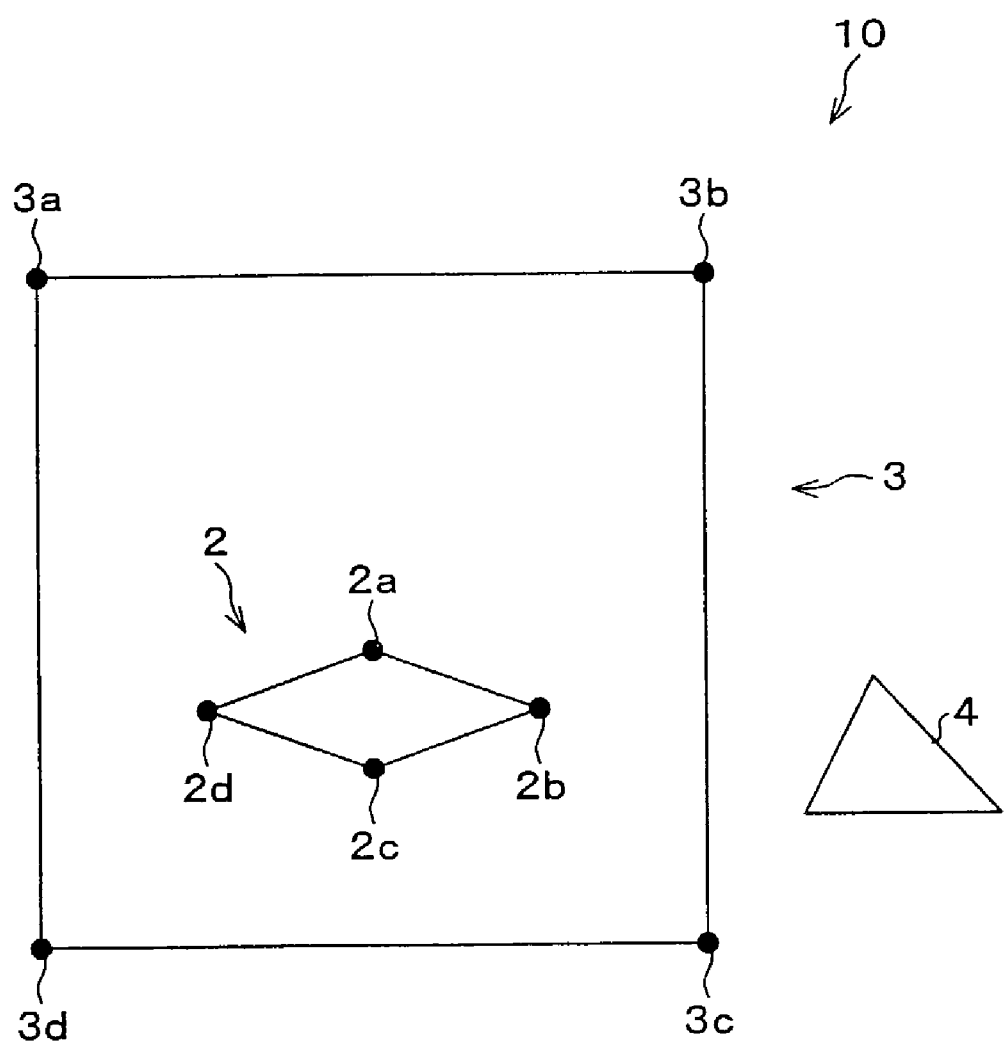
FIG. 2 is a drawing schematically showing one example of an object used in the animation creating method according to the present invention.
Figure 3:
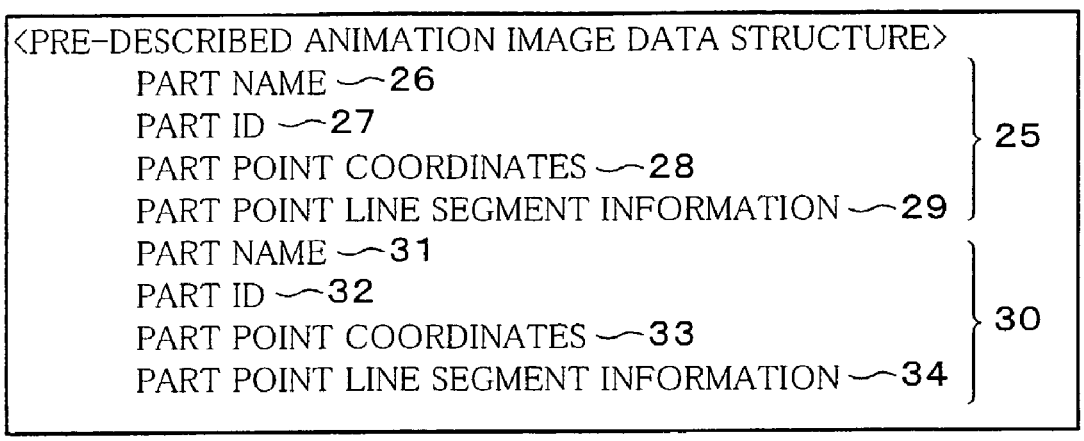
FIG. 3 is a drawing showing one example of a data structure of pre-described animation image data used in the animation creating method according to the present invention.
Figure 4:
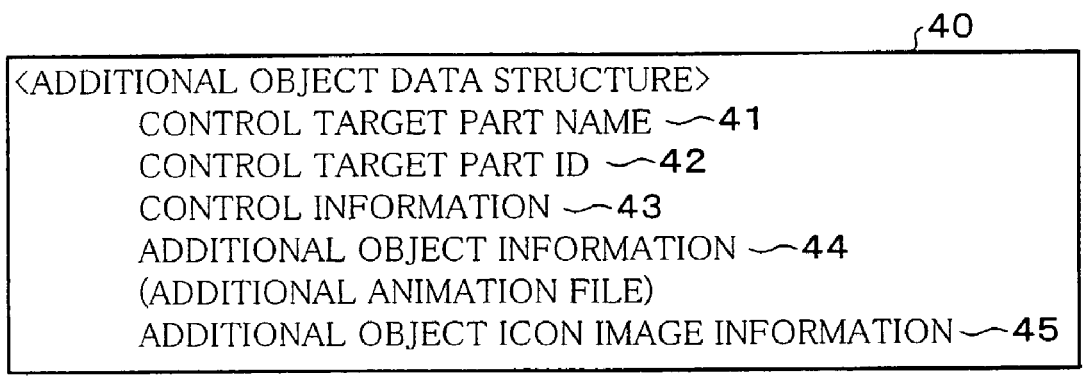
FIG. 4 is a drawing showing one example of a data structure of an additional object used in the animation creating method according to the present invention.

Referring to FIG. 2, FIG. 3, and FIG. 4, the following describes an example of a data structure of the pre-described animation image data selected in the pre-described animation image selecting section 12, i.e., a data structure of one of the pre-described animation image data stored in the pre-described animation image DB 11.

In this example, the pre-described animation image data contains a motion object that is made up of a plurality of parts. The movement of the motion object is controlled for each part. In this way, animation (character animation) can be realized, in which human motions, for example, such as a change in facial expressions or movement of arms and feet are expressed. Further, in this example, the motion object is represented by the coordinates of points and the information of line segments connecting these points. In this way, movements of the motion object can be easily expressed.

In this example, the pre-described animation image data is the data of a motion object 10 that is made up of two parts 2 and 3, as shown in FIG. 2. The part 2 is made up of four points 2a through 2d and four line segments connecting these adjacent points 2a through 2d. Similarly, the part 3 is made up of four points 3a through 3d and four line segments connecting these adjacent points 3a through 3d. The movement or shapes of the parts 2 and 3 making up the motion object 10 are controlled by control information 43 that is contained in the additional object data 40, as will be described later.

Note that FIG. 2 only shows a still image that is obtained when the motion object 10 and an additional object 4 are superimposed. This is for convenience of explanation and FIG. 2 does not show the composite image. Further, the number of motion objects, the number of parts, making up the motion object, the number of points in each part, and the number and shapes of lines connecting points of each part are not particularly limited.

The data of the motion object 10, i.e., the pre-described animation image data stored in the pre-described animation image DB 11 has a structure, as shown in FIG. 3, that includes part data 25, which is data concerning the part 2, and part data 30, which is data concerning the part 3, in addition to a file name and a file ID of a pre-described animation image file (hereinafter "pre-described animation image file name" and "pre-described animation image file ID", respectively, neither is shown), which is a file describing the pre-described animation image data.

The part data 25 includes: a part name 26, which is the name of the part 2; a part ID 27, which is the ID of the part 2; part point coordinates 28, which are the coordinates of the points 2a through 2d making up the part; and part point line segment information 29, which is the information of four line segments connecting the points 2a through 2d making up the part (information on thickness or color of the line segments, or the color of the area surrounded by the line segments). The part data 30 includes: a part name 31, which is the name of the part 3; a part ID 32, which is the ID of the part 3; part point coordinates 33, which are the coordinates of the points 3a through 3d making up the part; and part point line segment information 34, which is the information of four line segments connecting the points 3a through 3d making up the part (information on thickness or color of the line segments, or the color of the area surrounded by the line segments).

Referring to FIG. 4, the following describes a data structure of the additional object data selected in the additional object selecting section 14, i.e., a data structure of one of the plurality of additional object data stored in the additional object DB 13.

As shown in FIG. 4, an additional object data 40 includes: a file name of a pre-described animation image file describing the pre-described animation image data to be controlled (hereinafter, "control target pre-described animation image file name", not shown); a file ID of the pre-described animation image file describing the pre-described animation image data to be controlled (hereinafter, "control target pre-described animation image file ID", not shown); a control target part name 41; a control target part ID 42; control information 43; additional object information 44; and additional object icon image information 45. Note that, the additional object data 40 may additionally include an area of the additional object in the pre-described animation image data (adding position area). The control target part name 41 may be omitted.

The control target part name 41 stores the name (part name 26 or part name 31) of the part that is under the control of the additional object 4. The control target ID 42 stores the ID (part ID 27 or part ID 32) of the part that is under the control of the additional object 4. The control information 43 stores the information for controlling the movement or shapes of the parts 2 and 3 making up the motion object 10 (control amount of the parts 2 and 3).

The additional object information 44 stores the information of the additional object 4 to be added to the pre-described animation image data. The additional object information 44 may be still image data of the additional object 4, for example. Here, however, the additional object information 44 is an animation file that describes the animation of the additional object 4 (additional animation). In the following, the explanation will be given through the case where the additional object information 44 is an additional animation file 44.

The additional object icon image information 45 stores information concerning additional object icons that depict the contents of the additional object data 40 for user friendliness. The functions of the additional object icons will be described later.

Figure 5:
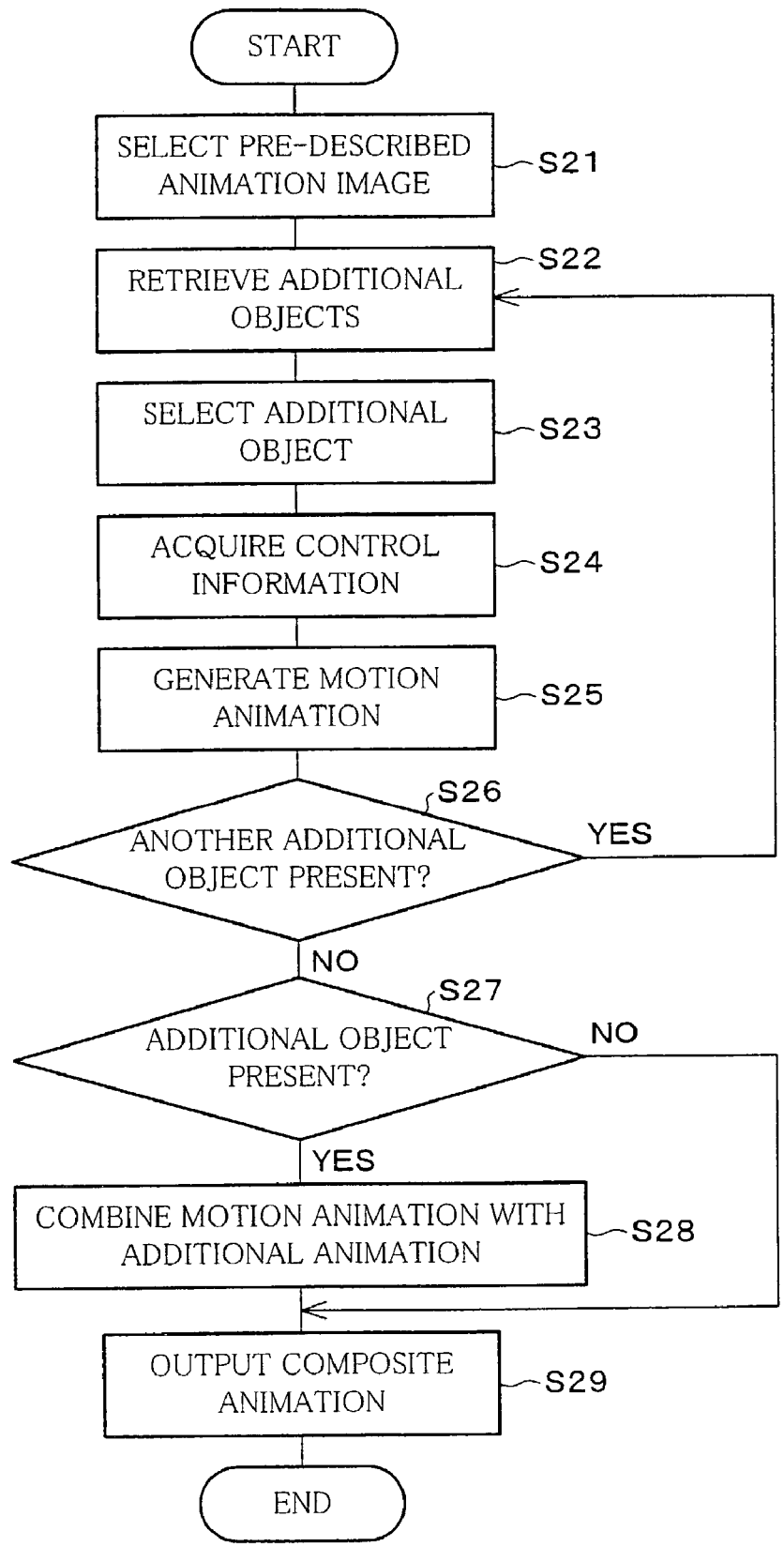
FIG. 5 is a flowchart showing an embodiment of the animation creating method according to the present invention.

Referring to the flowchart of FIG. 5, the following describes processing steps of an animation creating method according to the present invention.

First, a user selects a pre-described animation image data that is to be used as a prescribed form of an additional animation (S21). Specifically, through the pre-described animation image selecting section 12, the user selects one of the different types of pre-described animation image data stored in the pre-described animation image DB 11. The selection can be made by opening a pre-described animation image file on a file manager that is realized by the installed OS in a personal computer, using, for example, a pointing device such as a mouse.

Preferably, the contents of the selected pre-described animation image data are indicated to the user when it is selected in S21. This enables the user to easily confirm that the selection of the pre-described animation image data has completed. The animation creating device 1 may indicate the selected pre-described animation image data to the user, for example, by displaying a file name. However, it is particularly preferable that the selected pre-described animation image data be displayed as an image, as illustrated in the display screen of FIG. 6 (described later). This makes it easier for the user to recognize the contents of the pre-described animation image data. It is therefore preferable, though not shown in FIG. 1, that the animation creating device 1 be provided with: a pre-described animation image data reading section, which reads out, from the pre-described animation image DB 11, the pre-described animation image data that was selected in response to the selection in the pre-described animation image selecting section 12; and a display device, which displays the pre-described animation image data as an image, based on the pre-described animation image data so read out. In this case, it is preferable that the display device displays the contents of the pre-described animation image data in a display screen (pre-described animation image display screen 51), which is different from a display screen (composite result display screen 53) in which composite animation is displayed. This makes it easier for the user to recognize how the pre-described animation image data and the composite animation are related to each other.

The foregoing described the case where different types of pre-described animation image data are provided. However, the present invention is also applicable to a single type of pre-described animation image data. In this case, S21 may be omitted.

In S22, additional objects that can be added to the pre-described animation image data selected in S21 are retrieved. The retrieval is carried out by the additional object data retrieving section 17 with respect to the additional object DB 13 in response to the selection in the pre-described animation image selecting section 12. Specifically, for example, from the additional object DB 13, the additional object data retrieving section 17 retrieves additional object data 40 with the same control target pre-described animation image file name as the pre-described animation image file name of the pre-described animation image data selected in the pre-described animation image selecting section 12. Alternatively, from the different types of additional object data stored in the additional object DB 13, the additional object data retrieving section 17 retrieves additional object data with the same control target pre-described animation image file ID as the pre-described animation image file ID of the pre-described animation image data selected in the pre-described animation image selecting section 12.

The result of retrieval, i.e., all the additional objects that can be added to the pre-described animation image data selected in S21 are displayed in the additional object display section 18. The additional objects may be displayed in texts, or more preferably in the form of icons (additional object icons) that represent shapes or functions of the additional objects, as shown in the additional object icon display screen 52 (described later). In this way, the additional objects to be added to the pre-described animation image data can be visually selected.

Note that, in S22, the retrieval in the additional object data retrieving section 17 may be omitted and all additional objects may be displayed as icons in the additional object display section 18. That is, the additional object data retrieving section 17 may be omitted in the animation creating device 1 of FIG. 1. However, this is disadvantageous because the displayed icons in this case include unnecessary icons that cannot be used, requiring a large icon display screen, encouraging the user to erroneously select an additional object that cannot be used, and making it difficult for the user to quickly find the icon he or she desires.

Further, the step S22 itself maybe omitted. Thus, both the additional object data retrieving section 17 and the additional object display section 18 may be omitted in the animation creating device 1 of FIG. 1. However, this is disadvantageous in terms of versatility because the additional object can only be selected by a user who knows which additional objects are usable.

In S23, through the additional object selecting section 14 and from the additional objects that can be added to the pre-described animation image data selected in S21, i.e., from the additional objects retrieved in S22, the user selects an additional object to be added to the pre-described animation image data selected in S21.

The selection of the additional object by the user may be made from the headings in a pull-down menu, or more preferably by dragging the additional object icon displayed in the additional object icon display screen 52 into the pre-described animation image display screen 51 displayed in S21, using a pointing device, as will be described later. Selecting the additional object icon in this way enables the user to select the additional object icon by knowing the shape or function of the additional object, thereby improving operability.

In S24, in response to the selection in the additional object selecting section 14, the control information acquiring section 19 from the additional object DB 13 selects control information, contained in the additional object data 40 selected in the additional object selecting section 14, that controls movement of the motion object (control information 43 that controls the parts 2 and 3 making up the motion object 10 in the example of FIG. 2 through FIG. 4).

In the motion animation generating section 20, the movement of the motion object is controlled with respect to the pre-described animation image data, based on the control information acquired in S24, so as to generate motion animation (S25). In the example of FIG. 2 through FIG. 4, the motion animation generating section 20 based on the control information 43 controls at least one of the parts 2 and 3 making up the motion object 10, so as to move the part 2 and/or part 3 and thereby generate motion animation. The motion animation is outputted from the motion animation generating section 20 as an animation file.

In S26, the system waits for user's instructions as to whether another additional object should be added, in addition to the additional object that was selected in S23, with respect to the pre-described animation image data selected in S21. The instructions are given through a selection completion instructing section (not shown)—provided in the animation creating section 1—which instructs the system to end the selection of the additional object. The instructions for ending the selection may be carried out, for example, by clicking a selection completion instructing button that is displayed on the display device, using a pointing device.

If Yes in S26, i.e., if another additional object is selected in addition to the additional object selected in S23, the sequence returns to S22. In this case, in S22, another set of additional objects that can be added is retrieved from the additional object DB 13, in addition to the additional objects selected in S23.

If No in S26, i.e., if the user did not select another additional object in addition to the additional object selected in S23, the sequence goes to S27.

Note that, the sequence goes to S27 only when the user enters his or her decision in S26 (the decision that another additional object will not be added). However, the sequence may alternatively goes directly to S27, omitting S26, without the user's decision.

In S27, the presence or absence of animation to be added to the motion animation, i.e., the presence or absence of additional animation is decided. Specifically, a search is made through the additional object DB 13 by the additional animation reading section 21 to find data of the additional object (additional object data 40 in FIG. 4) selected by the user through the additional object selecting section 14. The information of animation to be added to the motion animation (additional animation file 44 in FIG. 4) is then retrieved from the data so found.

If the additional animation file was not found in S27, the motion animation that was outputted to the file in S24 is outputted (displayed) as a motion image from the composite animation output section 16 and to the file (S29).

If the additional animation file 44 was found in S27, the additional animation reading section 21 reads out the additional animation file 44 from the additional object DB 13. The additional animation file is then combined with the motion animation so as to create composite animation (S28). The composite animation so created is outputted (displayed) as a motion image from the composite animation section 16 and to the file (S29).

A process flow of the animation creating method according to the present embodiment has now been described.

The animation creating method according to the present embodiment can be realized by a computer-readable recording medium, which records an animation creating program that describes the animation creating process according to the present embodiment, in combination with a computer, such as a personal computer, in which a microprocessor for running the animation creating program is installed. The computer-readable recording medium may be a memory that is installed in the computer as an internal storage device, for example, such as a ROM (Read Only Memory). Alternatively, the computer-readable recording medium may be a medium that is installed in and read by a recording medium reading device that is connected as an external storage device to the computer.

In either case, the computer may be adapted to run the program that is stored in the recording medium by accessing the program from the microprocessor. Alternatively, the program stored in the recording medium may be run by the microprocessor after reading the program into a program storage area in the computer.

The recording medium may be any recording media that can be provided separately from the microprocessor. Examples of such recording media include: tape media such as a magnetic tape and a cassette tape; magnetic disk media such as a floppy disk and a hard disk; optical disk media such as a CD-ROM (Compact Disc Read Only Memory), an MO (Magneto-Optical) disk, an MD (Mini Disc), a DVD (Digital Video Disc); card media such as an IC (Integrated Circuit) card (including a memory card) and an optical card; and media (non-volatile memory) that permanently carry a program in a semiconductor memory, such as a mask ROM, an EPROM (Erasable and Programmable Read Only Memory), an EEPROM (Electrically Erasable and Programmable Read Only Memory), and a flash memory.

For computers in a system that can be connected to communication networks such as the Internet, the recording medium may be a medium that temporarily carries a program that was downloaded from the communication network. The program can be downloaded from the communication network by providing a download program in advance in the computer, or by installing a download program from another recording medium.

Figure 6:
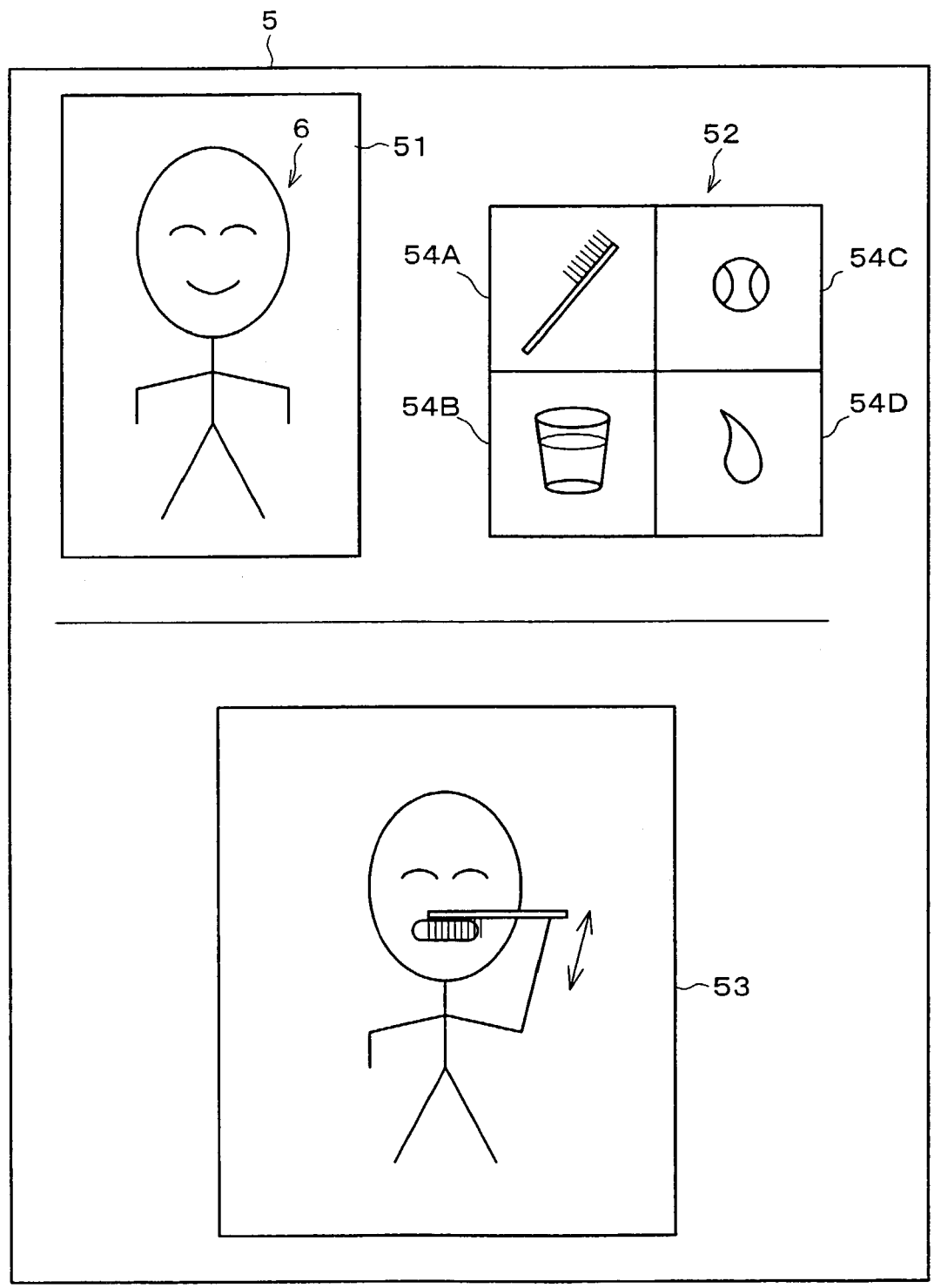
FIG. 6 is a drawing showing one example of a display screen displayed by an animation creating program according to the present invention.
Figure 7:
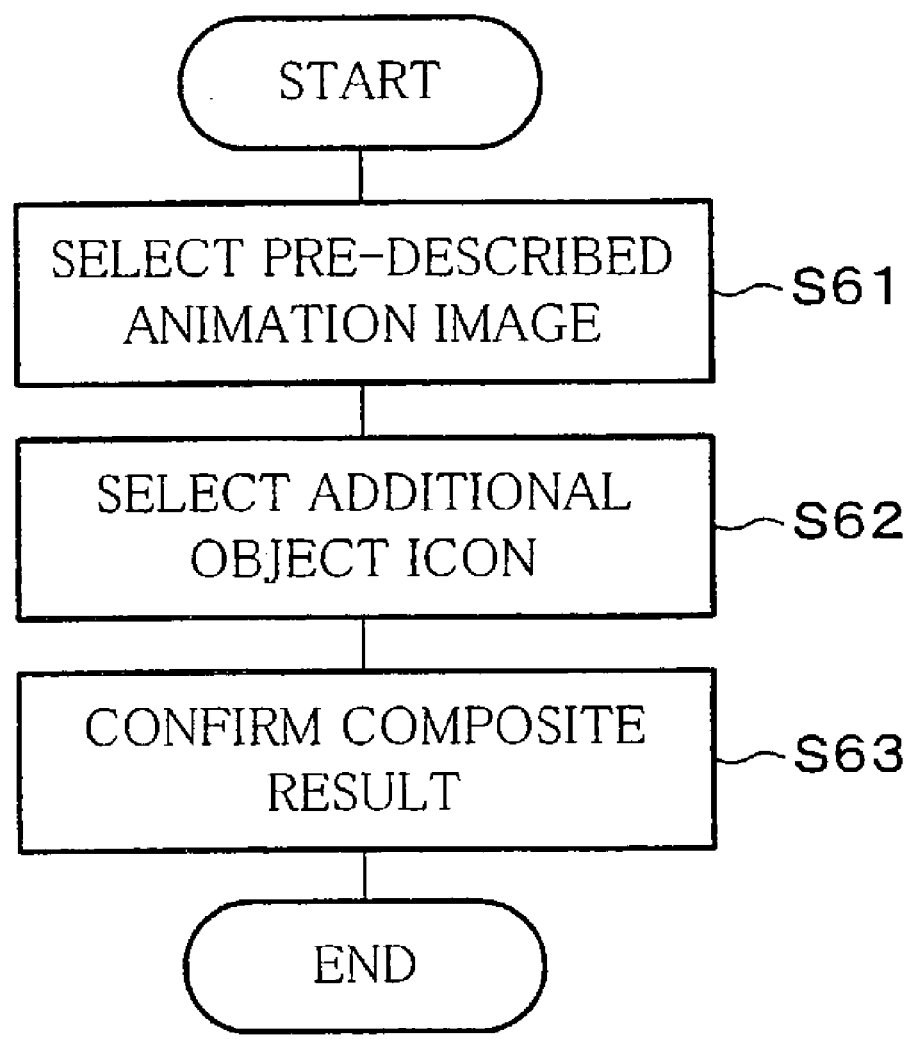
FIG. 7 is a flowchart showing procedures of user operations in an embodiment of the animation creating method according to the present invention.

Referring to FIG. 6 and FIG. 7, the following describes an example of an animation creating application (animation creating program) for executing the animation creating method of the present embodiment. FIG. 6 shows an example of a display screen for the animation creating application executing the animation creating method of the present embodiment.

The animation creating device 1 for executing the animation creating application includes, though not shown, a computer, in which a microprocessor and a memory for executing the animation creating application are installed; an external storage device, such as a hard disk, which stores the animation creating application; a display device with a display screen, such as a CRT display or a liquid crystal display; and a pointing device, which the user uses to perform operations of animation creation.

As shown in FIG. 6, a display screen 5 of the animation creating application includes: a pre-described animation image display screen 51 in which a character 6 is displayed as a motion object of pre-described animation image data; an additional object icon display screen 52 for displaying an additional object; and a composite result display screen 53 for displaying composite animation.

Referring to FIG. 7, the following describes procedures of animation creation operations by the user using the animation creating application.

In S61, the user selects a character 6. For example, the user opens a file that contains the data of a desired character 6 (pre-described animation image data), using a pointing device, on a file manager that is realized by a pre-installed OS in an external storage device. The step of this operation corresponds to S21 of FIG. 5.

In response to the user operation in S61, the animation creating application displays the selected character 6 in the pre-described animation image display screen 51 of the display screen 5. The animation creating application, based on the additional object icon image information 45, also displays icons that represent additional objects (additional object icons 54A through 54D) in the additional object icon display screen 52.

Preferably, the animation creating application displays the additional object icons 54A through 54D such that only the additional object icons 54A through 54D of the additional objects that were found by automatically retrieving additional objects that could be added to the pre-described animation image data selected in S61 are displayed in the additional object icon display screen 52. That is, it is preferable that the animation creating application automatically displays, in the additional object icon display screen 52, only the additional object icons 54A through 54D that correspond to the additional object data with the control information controlling the constituting parts of the character 6.

In order to realize this function, it is further preferable that the animation creating device 1 of the present embodiment is provided with an additional object DB 13 that describes correspondences between the data of the character 6 (pre-described animation image data) and the additional objects that can be added to the character 6. With such an additional object DB 13, S21 of FIG. 5 may be omitted.

In S62, from the additional object icons 54A through 54D displayed in the additional object icon display screen 52, the user selects an additional object icon (one of 54A through 54D) that corresponds to an additional object to be added to the character 6 that was selected in S61. An additional object icon can be selected by dragging one of the additional object icons 54A through 54D displayed in the additional object icon display screen 52 into the pre-described animation image display screen 51, using a pointing device. The step of this operation corresponds to S23 of FIG. 5. As required, the user selects another additional object icon by repeating S62.

Immediately after the end of the user operation in S62, the animation creating application combines the pre-described animation image data with the additional animation data in the animation composite section 15, and outputs (displays) the composite result (composite animation) to the composite result display section 53 via the composite animation output section 16.

Finally, the user confirms the composite result (composite animation) displayed in the composite result display screen 53 (S63).

As described in the BACKGROUND OF THE INVENTION section, in one known animation creating method for creating character animation that represents character motions or facial expressions, the movement or shape of each part making up an animation character that is described by a predetermined method, or that making up one frame of the animation, or that making up an animation story of a certain time length is changed.

Character animation can be thought as independent movement of individual parts making up the character. A viewer of the character animation recognizes the "meaning" of the character animation only after he or she has perceived and integrated changes in movement or shapes of the individual parts.

For example, a viewer watching character animation of a human face that is spreading its mouth as we do when pronouncing "e" cannot really tell the meaning of this movement. That is, the viewer cannot recognize whether that person is being angry at something, smiling at something, or brushing his/her teeth. The viewer, on the other hand, can easily recognize that the person is brushing his/her teeth when a tooth brush is displayed with the spreading mouth pronouncing "e".

In other words, the viewer can readily recognize the action of brushing the teeth when the mouth of the character changes its shape as if it pronounced "e" at the timing when a tooth brush is displayed on the pre-described character animation, and when the animation develops into a story of brushing teeth.

Thus, adding an object to the character animation is useful because it helps the viewer to recognize the "meaning" of the character animation. The present invention is therefore particularly suitable as a method of adding an object to character animation.

Referring to FIG. 5 and FIG. 6, the following describes an example in which the animation creating method of the present embodiment is applied to character animation.

In the Example of FIG. 6, the user in the step of selecting pre-described animation image data in S21 selects a file of the character 6 that is displayed in the pre-described animation image display screen 51. In the step of selecting an additional object in S23, the user selects the additional object icon 54A, representing a tooth brush, from the additional object icons 54A through 54D displayed in the additional object icon display screen 52.

After the additional object icon 54A is selected, the animation creating device 1 generates composite animation through S24 to S28 in FIG. 5.

Here, the additional object data corresponding to the additional object icon 54A carries control information with respect to the constituting parts of the character 6, or more specifically control information with respect to the parts making up the left arm and mouth of the character 6, in addition to an animation file (additional object information) of a moving "tooth brush." Thus, in S25, the motion animation generating section 20, based on the control information of the additional object data, controls movement of the parts making up the left arm and mouth of the character 6, so as to generate animation (motion animation) of the character 6 moving its left arm and mouth. In S28, the animation composite section 15 combines the animation of the character 6 with additional animation of a moving tooth brush, so as to generate composite animation.

The composite animation so generated is outputted (displayed) in S29 by the composite animation output section 16 to the composite result display screen 53 of FIG. 6. In this case, the composite result display screen 53 displays the character 6 of the pre-described animation image display screen 51 brushing its teeth. More specifically, in the composite result display screen 53 is displayed composite animation in which the mouth of the character 6 changes its shape as if it pronounced "e" and the tooth brush is moved up and down according to the movement of the left arm of the character 6.

Note that, here, because the additional object is a tooth brush, the additional object is added to a defined position, i.e., to the position of the mouth of the character 6. For other types of additional objects, the user may be allowed to designate a position to which the additional object is added. A position of the additional object can be designated, for example, by a function of the animation creating device 1, whereby dragging an icon indicative of the additional object by the user using a pointing device enables the animation creating device 1 to detect the position of the dragged icon and display the icon on this position.

Processing steps of the character animation creating method is described below in detail with reference to FIG. 1, the flowchart of FIG. 5, FIG. 8(a) and FIG. 8(b), FIG. 9, and FIG. 10.

A data structure of the pre-described animation image data is described first with reference to FIG. 8(a) and FIG. 8(b), and FIG. 9.

The pre-described animation image data of the "human type" for creating the animation of the character 6 shown in FIG. 8(a) and FIG. 8(b) includes: a file name of the file describing the pre-described animation image data (pre-described animation image file name); an ID of the file describing the pre-described animation image data (pre-described animation image file ID); and part data of each part of the motion object contained in the pre-described animation image data being controlled (part name, part ID, part point coordinates, and part point line segment information of each part).

A data structure of the pre-described animation image data is described below. To save space, the following describes only part data concerning a part 61 and part data concerning part 62, respectively making up the character 6 shown in FIG. 8(a) and FIG. 8(b), among the part data making up the pre-described animation image data, with reference to FIG. 9.

First, a data structure of the part data of the part 61 is described below. As shown in FIG. 9, the part data of the part 61 includes: a part name: 61.part; a part ID: 61; part point coordinates (coordinates of part points 63 and 64 making up the part 61):(X63, Y63), (X64, Y64); and part point line segment information: line 61, which is the information of a line segment connecting the part points 63 and 64 shown in FIG. 8(b). The information of the part point line segment information: line 61 tells the thickness and/or color of the line segment connecting the part points 63 and 64. When parts make up a polygon, the part point line segment information of the part data also includes information on color of the area surrounded by the part point line segments.

A data structure of the part data of the part 62 is described below. As shown in FIG. 9, the part data of the part 62 includes: a part name: 62.part; a part ID: 62, part point coordinates (coordinates of parts 64 and 65 making up the part 61):(X64, Y64), (X65, Y65); and part point line segment information: line 62, which is the information of the line segment connecting the part points 64 and 65 shown in FIG. 8(b). The information of the part point line segment information: line 62 tells the thickness and/or color of the line segment connecting the part points 64 and 65. When parts make up a polygon, the part point line segment information of the part data also includes information on color of the area surrounded by the part point line segments.

Referring to FIG. 10, a data structure of the additional object data is described below. As shown in FIG. 10, the additional object data includes: additional object icon image information; a control target pre-described animation image file name (file name of the file describing the pre-described animation image data being controlled): 6.anime; a control target pre-described animation file ID (ID of the file describing the pre-described animation image data being controlled): an additional animation file (additional object information); a control target part ID (61, 62, 63, 64), which is the part ID of a part of the motion object controlled by the additional object; and a control amount (control information) of a part of the motion object controlled by the additional object. The control amount will be described later.

Referring to the flowchart of FIG. 5, processing steps of the character animation creating method is described below.

First, as described earlier, a user selects a pre-described animation image data that is to be used as a prescribed form of an additional animation (S21). In S22, additional objects that can be added to the selected pre-described animation are retrieved.

What is actually carried out in S22 is that, based on the pre-described animation image file name or ID in the pre-described animation image data selected in S21, additional object data with a control target pre-described animation image file name or ID that matches the pre-described animation image file name or ID in the pre-described animation image data is retrieved from different types of additional object data stored in the additional object DB 13. An additional object icon that corresponds to the additional object data so found is displayed.

More specifically, when data of the character 6 that contains the part data shown in FIG. 9 is entered as the pre-described animation image data in S21, i.e., when there is entry of pre-described animation image data that has the data of pre-described animation image file name: 6.anime and the data of pre-described animation image file ID: 6, a search is made is S22 through different types of additional object data stored in the additional object DB 13 to retrieve therefrom additional object data that stores the control target pre-described animation image file name: 6.anime or the control target pre-described animation image file ID:6. An additional object icon that corresponds to the additional object data so found is displayed on the display screen (additional object icon display screen 52).

In the next step, from the displayed additional object icons, the user selects an additional object to be added to the pre-described animation image data, as described earlier (S23). In S24, control information contained in the selected additional object data 40 is acquired.

Then, based on the control information acquired in S24, movement of the motion object is controlled with respect to the pre-described animation image data, so as to generate motion animation, as described earlier (S25).

Figure 12:
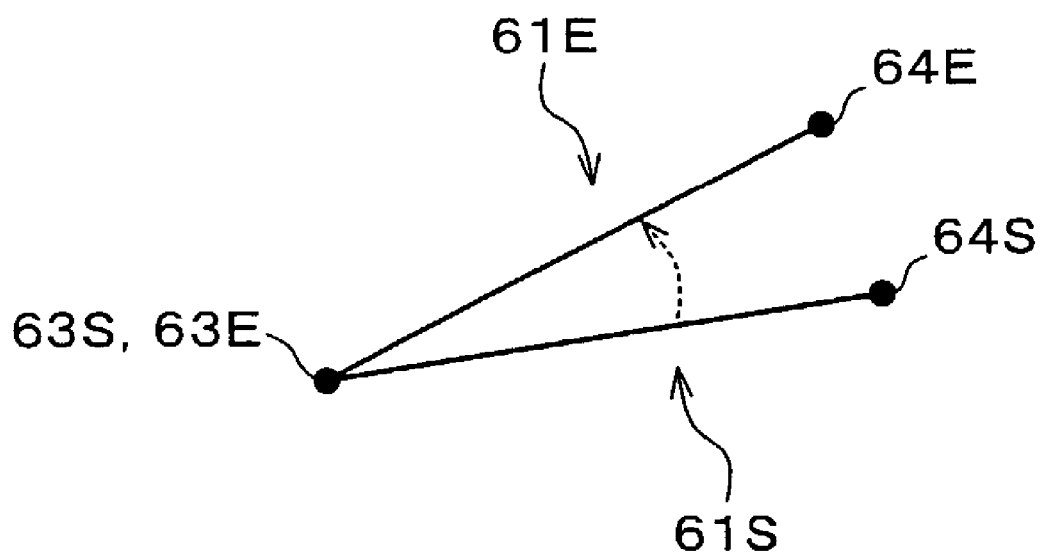
FIG. 12 is an explanatory drawing explaining a method of creating vector animation of a motion object in the animation creating method according to the present invention.

Referring to FIG. 11 and FIG. 12, the following describes how movement of the motion object is controlled based on the control object in S25. That is, movement control of the part 61 by a control amount of the additional object data shown in FIG. 10 is described. Note that, FIG. 11 shows a data structure of the part data of the part 61.

As shown in FIG. 9, the part data of the part 61 includes part point coordinates:(X63, Y63), (X64, Y64), and part point line segment information: line 61.

The data of control amount by the additional object data for the part 61 with a part ID 61 is represented by (sx1, sy1, sx2, sy2)(ex1, ey1, ex2, ey2), as shown in FIG. 11. These are coordinates of the end points of two line segments 61S and 61E as shown in FIG. 12, i.e., the coordinates (sx1, sy1) of point 63S and the coordinates (sx2, sy2) of point 64S, and the coordinates (ex1, ey1) of point 63E and the coordinates (ex2, ey2) of point 64E. The part 61, with the additional object, is controlled as vector animation with the key frames of the two line segments 61S and 61E. Specifically, the part 61 is controlled such that the part points 63 and 64 in the first frame of the animation lie on points 63S and 64S, and the part points 63 and 64 (see FIG. 8(b)) in the last frame of the animation lie on points 63E and 64E. In the intermediate frames of the animation, the part 61 is controlled such that the part points 63 and 64 approach the points 63E and 64E from the points 63S and 64S. The line segments 61S and 61E are drawn with a thickness and a color as described in the point line segment information: line 60 of the part 61. That is, the line segments of the part 61 represented by vectors are expressed as vector animation with the key frames of at least two line segments (61S and 61E) that are represented by the control amount.

The animation so obtained as a result of such control is outputted to a file as motion animation.

Thereafter, if it is decided in S26 that another additional object is not present and in S27 there is additional animation, the sequence goes to S28, where the motion animation is combined with the additional animation. The composite animation is displayed on the display screen in S29.

The composite animation is created in the described manner. The composite animation so created is the result of controlling a part of the motion object included in the pre-described animation image data. In other words, the composite animation is obtained by deleting a part of the motion object from a portion of the pre-described animation image data where animation (vector animation) of the additional object is to be added, and by adding the animation of the additional object to this portion of the pre-described animation image data.

Second Embodiment

Another embodiment of the present invention is described below with reference to FIG. 13 through FIG. 15. Note that, for convenience of explanation, constituting elements having the same functions as those already described in the First Embodiment are given the same reference numerals and further explanations thereof are omitted here.

The First Embodiment described the method in which animation (motion animation) of a motion object is created according to an additional object and the motion animation is combined with the animation of the additional object so as to create animation. The example of FIG. 6 selects pre-described animation data that contains the character 6, as a motion object, displayed in the pre-described animation image display screen 51, and selects the additional object icon 54A, which represents a tooth brush as an additional object. As a result, animation of the character 6 brushing its teeth with the left arm (hereinafter "left arm teeth brushing animation") is created as composite animation and displayed in the composite result display screen 53.

When the method of the First Embodiment is to be used to create animation of the character 6 brushing its teeth with the right arm (hereinafter "right arm teeth brushing animation") as composite animation displayed in the composite result display screen 53, the creation of the "right arm teeth brushing animation" requires additional object data that includes: control information for controlling movement of parts making up the right arm and mouth of the character 6; and additional object icon image information that represents the "right arm teeth brushing animation."

Using different additional object data for the "right arm teeth brushing animation" and the "left arm teeth brushing animation" is not economical because it requires two types of additional object icons. Further, using a large number of additional object icons is disadvantageous because, for example, it requires a wider display screen and it makes it difficult for the user to quickly find the icon he or she desires.

An animation creating method of the present embodiment solves the foregoing problem by enabling different types of animation to be created with a single additional object icon by changing the movement of the motion object and additional object depending on the position in which the additional object is inserted by the user, even when the same additional object icon is selected.

An animation creating device used in the animation creating method of the present embodiment enables the user to enter information concerning a position of an inserted additional object, i.e., positional information that indicates a position of an added animation image of a second object in the pre-described animation image. Entry of the positional information is enabled by a function of the animation creating device, whereby the coordinates of an end point entered by the user, for example, by dragging the additional object icon using a pointing device (positional information input section) are detected and the additional object is added to the corresponding position of the end point coordinates of dragging in the pre-described animation image.

The animation creating method of the present embodiment is the same as the animation creating method of FIG. 5 described in the First Embodiment, except that the user in S23 designates an insert position of the additional object with respect to the motion object, for example, by dragging an additional object icon using a pointing device, and that the control information, which is acquired in S24 according to the insert position of the additional object, is changed. The method of the present embodiment enables the motion animation to be changed depending on the insert position of the additional object in the step of generating the motion animation in S25, and thereby creates different composite animation depending on the insert position of the additional object.

Further, in order to switch the control information depending on the insert position of the additional object, the animation creating device of the present embodiment, in addition to the configuration of the animation creating device of the First Embodiment, includes a control information acquiring section 19 that, in addition to the function described in the First Embodiment, has a function of detecting an insert position of the additional object, for example, a position of a dragged additional object icon, so as to acquire control information according to such a position. It is required that the additional object includes plural pairs of control target part name 41, control target part ID 42, control information 43, and additional object information 44.

A specific example of the animation creating method of the present embodiment is described below with reference to FIG. 13(*a*), FIG. 13(*b*), and FIG. 14.

A data structure of the additional object data is described first with reference to FIG. 14.

The additional object data, as shown in FIG. 14, includes: additional object icon image information; a control target pre-described animation image file name (file name of the file describing the pre-described animation image data that is being controlled by the additional object): 6.anime; a control target pre-described animation image file ID (file ID of the file describing the pre-described animation image data that is being controlled by the additional object): 6; a range of the insert position fitting the additional object (adding position in the pre-described animation image data), i.e., adding position range; an additional animation file (additional object information); a control part ID (61, 62, 63, 64), which is the part ID of a part of the motion object being controlled by the additional object; and a control amount (control information) of a part of the motion object being controlled by the additional object. The control amount will be described later.

First, after the steps of S21 and S22 that are carried out in the same manner as in the method of FIG. 5, the user in S23 selects an additional object and designate an insert position of the additional object.

Next, it is decided in S24 whether the designated insert position of the additional object falls in which of adding position ranges that are described in the additional object data, so as to change the acquired control information depending on the adding position range of the insert position. Specifically, it is first decided whether the insert position of the additional object falls in which of adding position ranges described in the additional object data. More specifically, it is decided whether the insert position of the additional object with the coordinates (xt, yt) falls in an adding position range that corresponds to the control target part ID: 61, 62 or an adding position range that corresponds to the control target part ID: 63, 64, the former being an area of a rectangle connecting coordinates (x11, y11), (x12, y12), (x13, y13), (x14, y14), and the latter being an area defined by the adding position range of the additional object data, i.e., an area of a rectangle connecting coordinates (x21, y21), (x22, y22), (x23, y23), (x24, y24).

When the insert position of the additional object is in the adding position range that corresponds to the control target part ID: 61, 62, a control amount that corresponds to the control target part ID: 61, 62 is acquired. When the insert position of the additional object is in the adding position range that corresponds to the control target part ID: 63, 64, a control amount that corresponds to the control target part ID: 63, 64 is acquired. In this manner, a constituting part of the motion object being controlled can be selected according to the insert position of the additional object as designated by the user in S23.

Figure 8:
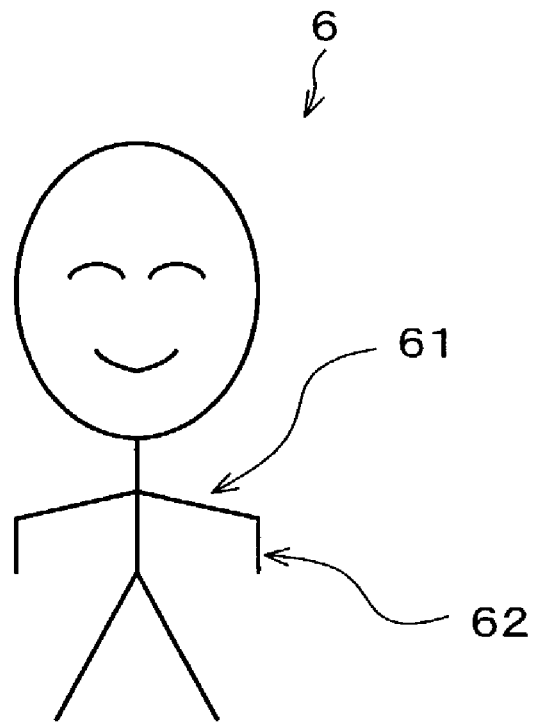
Figure 8:
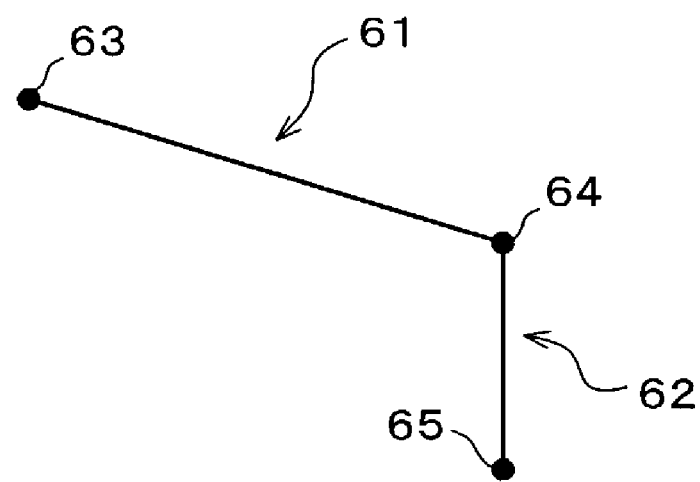

In the example of FIG. 13(*a*) and FIG. 13(*b*), the adding position range corresponding to the control target part ID: 61, 62 is set around the parts (parts 61 and 62 in FIG. 8(*a*) and FIG. 8(*b*)) of the part ID: 63, 64 making up the left arm of the character 6. The adding position range corresponding to the control target part ID: 63, 64 is set around the parts of the part ID: 63, 64 making up the right arm of the character 6. Note that, it is assumed here that the pre-described animation image display screen 51 of FIG. 13(*a*) and FIG. 13(*b*) displays the same pre-described animation image as the pre-described animation image display screen 51 of FIG. 6.

Thus, in the example of FIG. 13(*a*) and FIG. 13(*b*), when the position of the end point of dragging the additional object icon 54A representing the tooth brush in S24 is in an area around the left arm of the character 6, the control information of the parts of ID: 61, 62 making up the left arm of the character 6 is acquired. On the other hand, when the position of the end point of dragging the additional object icon 54A representing the tooth brush is in an area around the right arm of the character 6, the control information of the parts of ID: 61, 62 making up the right arm of the character 6 is acquired.

In this way, by dragging the additional object icon 54A to the area around the left arm or right arm of the character 6, the moving arm, right or left, of the character 6 can be changed. As a result, depending on the dragged position of the additional object icon 54A, two types of composite animation, left arm teeth brushing animation 74 and right arm teeth brushing animation 75, with different moving parts of the character 6 are outputted.

In the described manner, the animation creating method of the present embodiment enables different types of composite animation with different moving patterns of the character 6 to be created with a single additional object icon. It is therefore possible to create various types of animation. Further, because less number of additional object icons are required, different types of composite animation with different moving patterns of the character 6 can be created in a relatively small display screen. In addition, the user can easily find the icon he/she desires.

In the foregoing method, the movement of the motion object and additional object is changed according to the insert position of the additional object. Alternatively, it is also possible to switch the type of an additional object depending on the insert position of the additional object, as in a method shown in FIG. 15(*a*) and FIG. 15(*b*). That is, even when the same type of additional object icon is selected, it is possible to select different types of additional objects with the single additional object icon, by selecting different additional objects depending on the insert position of the additional object.

It is therefore possible, for example as shown in FIG. 15(*a*), to generate composite animation 84, in which motion animation with the character 6 changing its face from a smiling face to a sad face is combined with additional animation in which tears (additional object) pour out of the eye of the character 6, when an additional object icon 54D representing a water drop is dragged to an area on the face of the character 6. On the other hand, it is also possible, as shown in FIG. 15(*b*), to generate composite animation 85, in which motion animation with the character 6 changing its face from a smiling face to a sad face is combined with additional animation in which rain (additional object) falls, when the additional object icon 54D representing a water drop is dragged to the background (portion other than the character 6) of the character 6.

With this method, animation of different types of additional objects (tear and rain) can be created with a single type of additional object icon (additional object icon 54D representing a water drop). It is therefore possible to create various types of animation. Further, because less number of additional object icons are required, different types of composite animation with different types of additional objects with different moving patterns can be created in a relatively small display screen. In addition, the user can easily find the icon he/she desires.

It is also possible to use the method of FIG. 13(*a*) and FIG. 13(*b*) and the method of FIG. 15(*a*) and FIG. 15(*b*) in combination. In this case, different types of animation with different moving patterns of the motion object and with different additional animation can be created with a single additional object icon.

Third Embodiment

Still another embodiment of the present invention is described below with reference to FIG. 16. Note that, for convenience of explanations, constituting elements already described in the First Embodiment are given the same reference numerals and further explanations thereof are omitted here.

The foregoing Second Embodiment described the method in which control information for controlling movement of the additional object included in pre-described animation is changed according to the insert position of the additional object with respect to the pre-described animation image data (FIG. 13(*a*) and FIG. 13(*b*)). The Second Embodiment also described the method in which an additional object is changed according to its insert position (FIG. 15(*a*) and FIG. 15(*b*)).

The present embodiment describes a more intuitive animation creating method, which incorporates the concept of time element in the order of inserting additional objects.

As described earlier, the number of additional objects added to the motion object is not just limited to one in the animation creating methods of the present invention. That is, one or more additional objects may be selected in the additional object selecting section 14.

The animation creating method of the present embodiment creates composite animation according to the order of selecting a plurality of additional objects in the additional object selecting section 14.

To this end, in the animation creating method of the present embodiment, the control information acquiring section 19 is adapted to acquire control information according to the order of selecting (inserting) additional object data, by first selecting first control information as control information included in previously selected additional object data, and then second control information as control information included in additional object data that is selected later. A motion animation generating section 20 controls movement of the motion object based on the first and second control information with respect to the pre-described animation image data, so as to generate motion animation.

Figure 16:
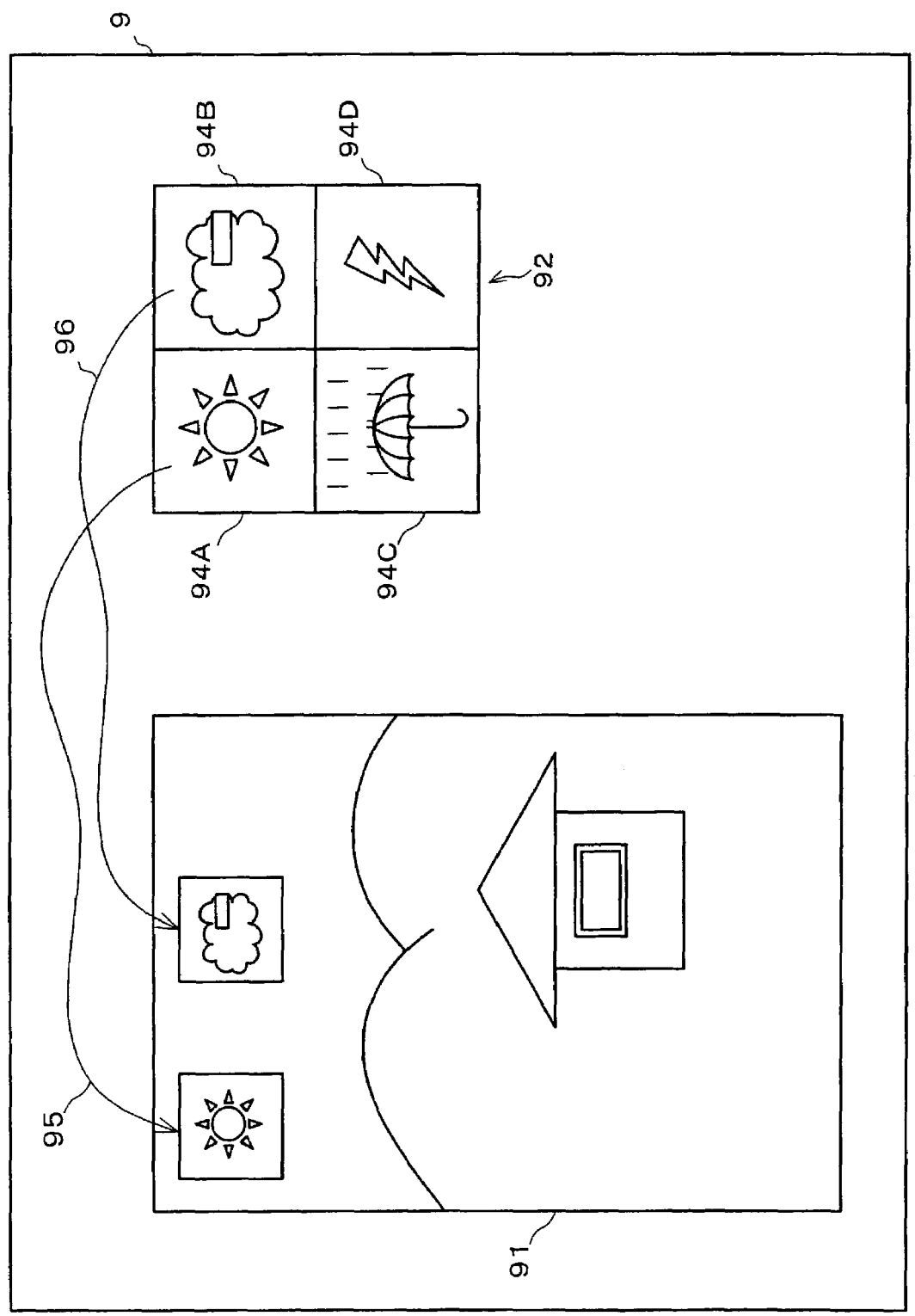
FIG. 16 is an explanatory drawing showing still another embodiment of the animation creating method according to the present invention.

Referring to FIG. 16, a specific example of the animation creating method of the present embodiment is described below.

As shown in FIG. 16, a display screen 9 has an additional object icon display screen 92 that displays additional object icons, such as a sunny icon 94A, a cloudy icon 94B, an icon 94C, and an icon 94D.

First, a user drags the sunny icon 94A to the left end of the displayed sky in a pre-described animation image display screen 91, as indicated by arrow 95, using a pointing device. The user then drags the cloudy icon 94B with the pointing device to a central portion of the displayed sky in the pre-described animation image display screen 91, as indicated by arrow 96.

According to the order of dragging the icons 94A and 94B, the control information acquiring section 19 acquires first control information by acquiring control information of the additional object data that corresponds to the icon 94A, and acquires second control information by acquiring control information of the additional object data that corresponds to the icon 94B. The motion animation generating section 20 then controls movement of the motion object with respect to the pre-described animation image data based on the first and second control information, so as to generate motion animation. In this example, the motion animation created is animation of sky as a motion object 10, changing from a bright state to a dark state.

Although no detailed explanation is given here for the composite animation for it is not possible to capture the time element on a paper, the resulting composite animation shows a change from a state of a blazing sun to a cloudy state.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICATIONS OF THE PRESENT INVENTION

As described, an animation creating method of the present invention includes the steps of: selecting a second object;

generating motion animation in which a first object moves according to the selected second object, using a pre-described animation image; and combining the motion animation with an animation image of the second object.

This enables the user to create composite animation, in which the animation image of the second object has been added to the pre-described animation image, without the operation of searching for animation of the first object that corresponds to the second object or newly creating such animation. The foregoing method therefore provides an animation creating method that merely requires simple operations and a short period of time to create composite animation, in which an object has been added to the pre-described animation image.

Further, as described, an animation creating method of the present invention includes the steps of: selecting at least one of second objects in relation to the first object; generating motion animation in which the first object moves according to contents of a relation between the selected second object and the first object, using the pre-described animation image; and combining the motion animation with the animation image of the second object.

This enables the user to create composite animation, in which the animation image of the second object has been added to the pre-described animation image, without the operation of searching for animation of the first object that corresponds to the second object or newly creating such animation. The foregoing method therefore provides an animation creating method that merely requires simple operations and a short period of time to create composite animation, in which an object has been added to the pre-described animation image.

Further, with this method, because the movement of the first object can be changed according to contents of a relation between the second object and the first object, a plurality of animation can be created with a single second object. The foregoing method therefore enables a variety of animation to be easily created.

As described, an animation creating device of the present invention is for creating composite animation by entering editing instructions so as to add a previously created second object to a pre-described animation image that includes a first object, and the animation creating device comprises: an object selecting section, which selects the second object; a motion animation generating section, which generates motion animation in which the first object moves according to the selected second object, using the pre-described animation image; and an animation composite section, which combines the motion animation with an animation image of the second object.

This enables the user to create composite animation, in which the animation image of the second object has been added to the pre-described animation image, without the operation of searching for animation of the first object that corresponds to the second object or newly creating such animation. The foregoing device therefore provides an animation creating device that merely requires simple operations and a short period of time to create composite animation, in which an object has been added to the pre-described animation image.

As described, an animation creating program of the present invention, in response to selection of the second object by a user, generates motion animation in which the first object moves according to the selected second object, using the pre-described animation image, and thereafter combines the motion animation with an animation image of the second object. Further, as described, a computer-readable recording medium of the present invention is configured to record the foregoing animation creating program.

This enables the user to create composite animation, in which the animation image of the second object has been added to the pre-described animation image, without the operation of searching for animation of the first object that corresponds to the second object or newly creating such animation. The foregoing configurations therefore provide an animation creating program and a computer-readable recording medium recording the animation creating program, which merely require simple operations and a short period of time to create composite animation, in which an object has been added to the pre-described animation image.

The invention claimed is:

1. An animation creating method for creating composite animation by entering editing instructions so as to add a previously created second object to a pre-described animation that includes a first object, said method comprising the steps of:
   selecting the second object;
   generating motion animation in which the first object moves according to the selected second object, using the pre-described animation; and
   combining the motion animation with an animation image of the second object in the composite animation.

2. The animation creating method as set forth in claim 1, further comprising the step of preparing plural types of object data that include the animation image of the second object and that include control information for controlling movement of the first object,
   said step of selecting the second object selecting at least one of said plural types of object data,
   said step of generating motion animation controlling movement of the first object based on the control information.

3. The animation creating method as set forth in claim 1, further comprising the step of entering positional information that is indicative of a position of the animation image of the second object added to the pre-described animation,
   said step of generating motion animation changing the motion animation in accordance with the positional information.

4. The animation creating method as set forth in claim 1, further comprising the step of entering positional information that is indicative of a position of the animation image of the second object added to the pre-described animation image, said step of selecting the second object changing the second object in accordance with the positional information.

5. The animation creating method as set forth in claim 1, wherein:
   said step of selecting the second object successively selects a plurality of different objects as second objects, and
   said step of generating motion animation controls movement of the first object based on order the second objects were selected.

6. The animation creating method as set forth in claim 1, further comprising the step of outputting composite animation, which is a result of composition of the motion animation with the animation image of the second object.

7. The animation creating method as set forth in claim 1, further comprising the step of displaying an icon that is indicative of the second object,
   said step of selecting the second object further including the step of selecting the displayed icon.

8. The animation creating method as set forth in claim 7, wherein said step of displaying an icon that is indicative of the second object displays only an icon that is indicative of a second object that can be added to the pre-described animation.

9. The animation creating method as set forth in claim 1, further comprising the steps of:
outputting an animation file, which is animation that was obtained by combining the motion animation with the animation image of the second object;
selecting a third object that is different from the second object;
generating second motion animation in which the first object moves according to the selected second object and the third object, using the output animation file; and combining the second motion animation with an animation image of the third object.

10. The animation creating method as set forth in claim 1, wherein:
said step of entering the second object enters additional animation, which is animation of the second object, and
said step of combining the motion animation with the second object combines the motion animation with the additional animation.

11. The animation creating method as set forth in claim 1, wherein the second object includes additional object data, and the movement of the first object according to the second object is determined by the additional object data, such that the movement of the first object according to the second object is pre-specified by the additional object data.

12. An animation creating method for creating composite animation by entering editing instructions so as to selectively add at least one of a plurality of previously created second objects to a pre-described animation that includes a first object, said method comprising the steps of:
selecting at least one of the second objects in relation to the first object;
generating motion animation in which the first object moves according to contents of a relation between the second object and the first object; and
combining the motion animation with an animation image of the second object in the composite animation.

13. The animation creating method as set forth in claim 12, further comprising the step of preparing plural types of object data that include control information for controlling the animation image of the second object and movement of the first object,
said step of selecting the second object selecting at least one of the plural types of object data, and
said step of generating motion animation controlling movement of the first object based on the control information.

14. The animation creating method as set forth in claim 12, further comprising the step of entering positional information that is indicative of a position of the animation image of the second object added to the pre-described animation,
said step of generating motion animation changing the motion animation in accordance with the positional information.

15. An animation creating device for creating composite animation by entering editing instructions so as to add a previously created second object to a pre-described animation that includes a first object, said animation creating device comprising:
an object selecting section, which selects the second object;
a motion animation generating section, which generates motion animation in which the first object moves according to the selected second object, using the pre-described animation; and
an animation composite section, which combines the motion animation with an animation image of the second object in the composite animation.

16. The animation creating device as set forth in claim 15, further comprising a positional information input section for entering positional information that is indicative of a position of the animation image of the second object added to the pre-described animation,
said motion animation generating section changing the motion animation in accordance with the positional information.

17. The animation creating device as set forth in claim 15, further comprising a positional information input section for entering positional information that is indicative of a position of the animation image of the second object added to the pre-described animation,
said object selecting section changing the second object in accordance with the positional information.

18. A computer-readable recording medium recording an animation creating program that creates composite animation upon entry of user editing instructions, by adding a previously created second object to a pre-described animation that includes a first object,
said computer-readable recording medium recording the animation creating program, in response to selection of the second object by a user, generating motion animation in which the first object moves according to the selected second object, using the pre-described animation, and thereafter combining the motion animation with an animation image of the second object in the composite animation.

19. An animation creating program that creates composite animation upon entry of user editing instructions, by adding a previously created second object to a pre-described animation that includes a first object,
said animation creating program, in response to selection of the second object by a user, generating motion animation in which the first object moves according to the selected second object, using the pre-described animation, and thereafter combining the motion animation with an animation image of the second object in the composite animation.

* * * * *